United States Patent
Shinohara et al.

[19]

[11] Patent Number: 6,160,838
[45] Date of Patent: Dec. 12, 2000

[54] SPREAD SPECTRUM TRANSMITTER, SPREAD SPECTRUM RECEIVER AND SPREAD SPECTRUM COMMUNICATION METHOD AND AUTOMATIC GAIN CONTROL CIRCUIT FOR SPREAD SPECTRUM RECEIVER

[75] Inventors: Yoshinori Shinohara; Kazuhiko Seki, both of Tokyo, Japan

[73] Assignee: Uniden Corporation, Tokyo, Japan

[21] Appl. No.: 08/987,024

[22] Filed: Dec. 9, 1997

[30] Foreign Application Priority Data

Dec. 13, 1996 [JP] Japan ................................. 8-333842
Sep. 16, 1997 [JP] Japan ................................. 9-250771

[51] Int. Cl.$^7$ .......................... H04B 15/00; H04K 1/00; H04L 27/30
[52] U.S. Cl. .......................... 375/130; 375/345
[58] Field of Search .................... 375/200, 206, 375/208, 259, 279, 295, 308, 316, 324, 326, 329, 345, 130, 140, 141, 142, 146, 147; 329/304, 306, 307; 332/103

[56] References Cited

U.S. PATENT DOCUMENTS

| | | | |
|---|---|---|---|
| 4,528,526 | 7/1985 | McBiles | 375/295 |
| 4,567,602 | 1/1986 | Kato et al. | 375/295 |
| 5,222,104 | 6/1993 | Medendrop | 375/316 |
| 5,473,290 | 12/1995 | Scomazzon et al. | 332/103 |
| 5,619,524 | 4/1997 | Ling et al. | 375/200 |
| 5,687,190 | 11/1997 | Tsao | 375/206 |
| 5,734,639 | 3/1998 | Bustamante et al. | 370/208 |
| 5,881,099 | 3/1999 | Takahashi et al. | 375/206 |
| 5,881,107 | 3/1999 | Termerinace et al. | 375/279 |

FOREIGN PATENT DOCUMENTS

| | | |
|---|---|---|
| 3-101534 | 4/1991 | Japan . |
| 5-344093 | 12/1993 | Japan . |
| 6-232838 | 8/1994 | Japan . |
| 6-244820 | 9/1994 | Japan . |
| 7-107007 | 4/1995 | Japan . |
| 7-131379 | 5/1995 | Japan . |
| 7-140224 | 6/1995 | Japan . |
| 7-183831 | 7/1995 | Japan . |
| 7-283762 | 10/1995 | Japan . |
| 7-288511 | 10/1995 | Japan . |
| 8-8782 | 1/1996 | Japan . |
| 8-32487 | 2/1996 | Japan . |
| 8-149048 | 6/1996 | Japan . |

*Primary Examiner*—Chi H. Pham
*Assistant Examiner*—Bryan Webster
*Attorney, Agent, or Firm*—McDermott, Will & Emery

[57] ABSTRACT

A spread spectrum transmitter and receiver are provided wherein data can be accurately decoded by removing the effect of mutual interference of the quadrature component and in-phase component even when there is carrier frequency error. In a method of spread spectrum communication using a QPSK modulation system, there are provided: a demodulating circuit that receives and demodulates a signal transmitted with a prescribed time difference Td applied between the IQ components; correlators that find the mutual correlation of the IQ components and spreading code; a sampling circuit that samples their output signals; a phase calculator that calculates the phase from the ratio of the IQ components of these output signals; a differential decoding circuit that performs differential decoding on this output signal; an automatic frequency control circuit that corrects the frequency error of this output signal; a decoding circuit; and a clock recovery circuit.

19 Claims, 14 Drawing Sheets

DIFFERENTIAL DECODING CIRCUIT

AUTMATIC FREQUENCY CONTROL CIRCUIT

RANGE OF DETECTION
OF PHASE ERROR

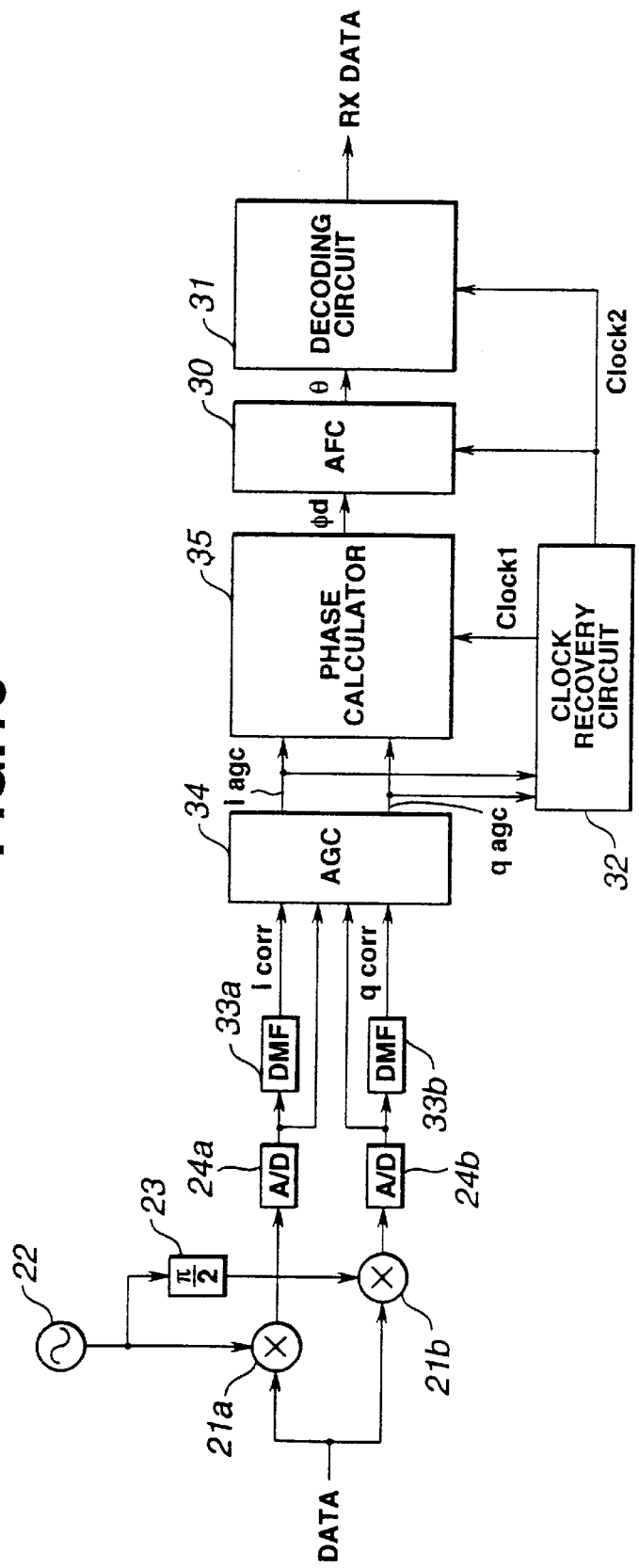

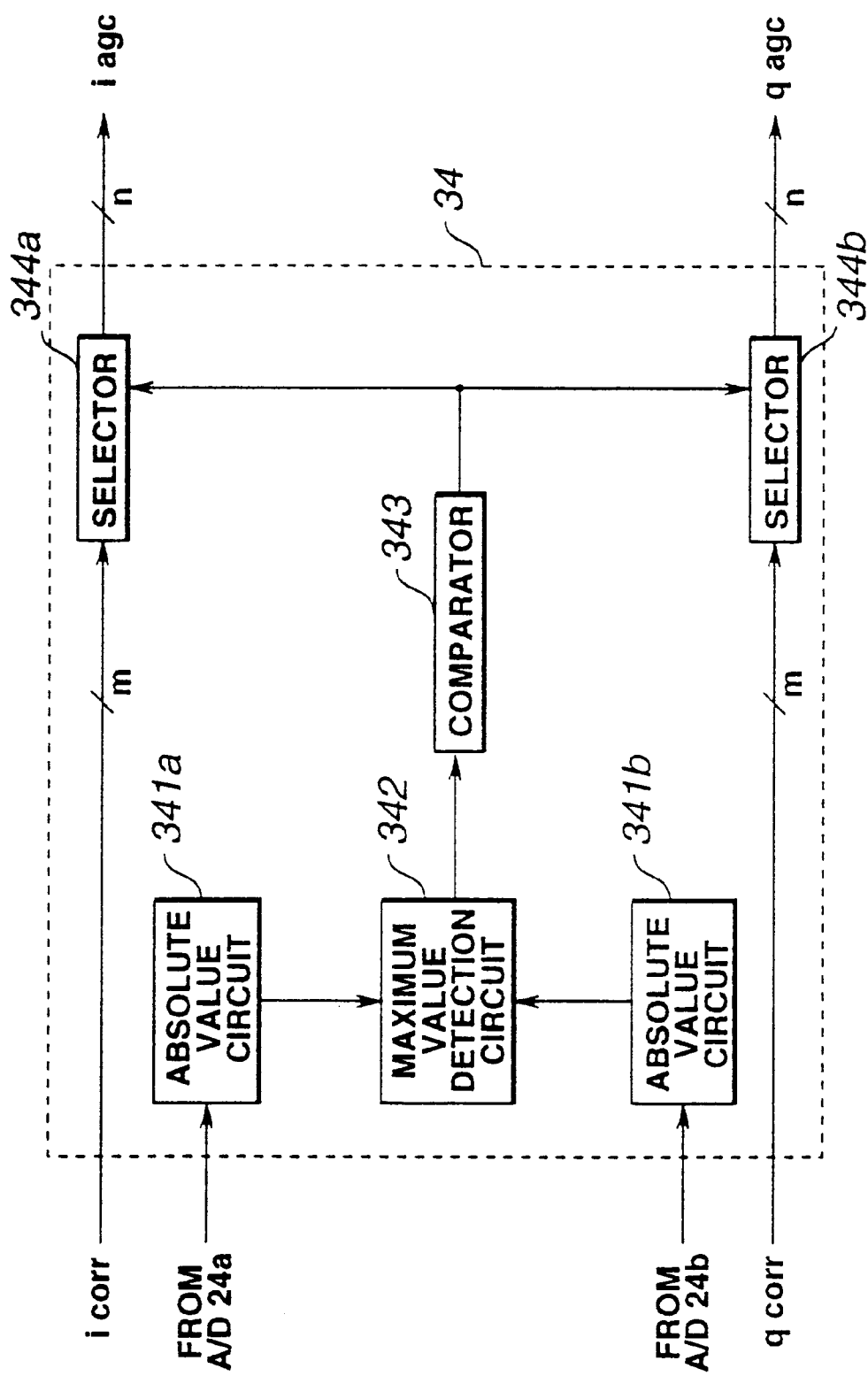

FIG.12

| MAXIMUM VALUE OF ABSOLUTE OF INPUT | MAXIMUM VALUE OF ABSOLUTE OF OUTPUT | VALID OUTPUT BITS |
|---|---|---|
| 24≦|INPUT VALUE|≦31 | |OUTPUT VALUE|≦682(31×22) | 11(10+CODE) |
| 12≦|INPUT VALUE|≦23 | |OUTPUT VALUE|≦506(23×22) | 10(9+CODE) |
| 6≦|INPUT VALUE|≦11 | |OUTPUT VALUE|≦242(11×22) | 9(8+CODE) |
| 3≦|INPUT VALUE|≦5 | |OUTPUT VALUE|≦110(5×22) | 8(7+CODE) |
| |INPUT VALUE|≦2 | |OUTPUT VALUE|≦44(2×22) | 7(6+CODE) |
| |INPUT VALUE|≦1 | |OUTPUT VALUE|≦22(1×22) | 6(5+CODE) |

SPREADING RATIO:11    OVERSAMPLING NUMBER:2[SAMPLE/CHIP]

NUMBER OF INPUT BITS TO DMF:6

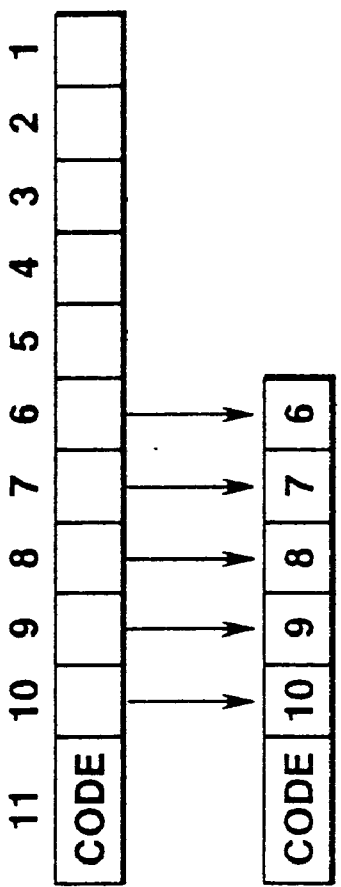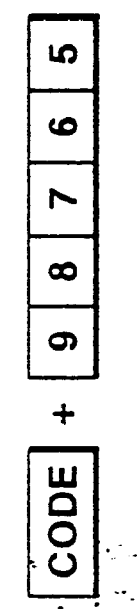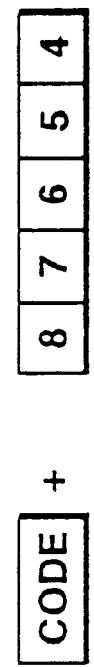
FIG.13A
FIG.13B
FIG.13C

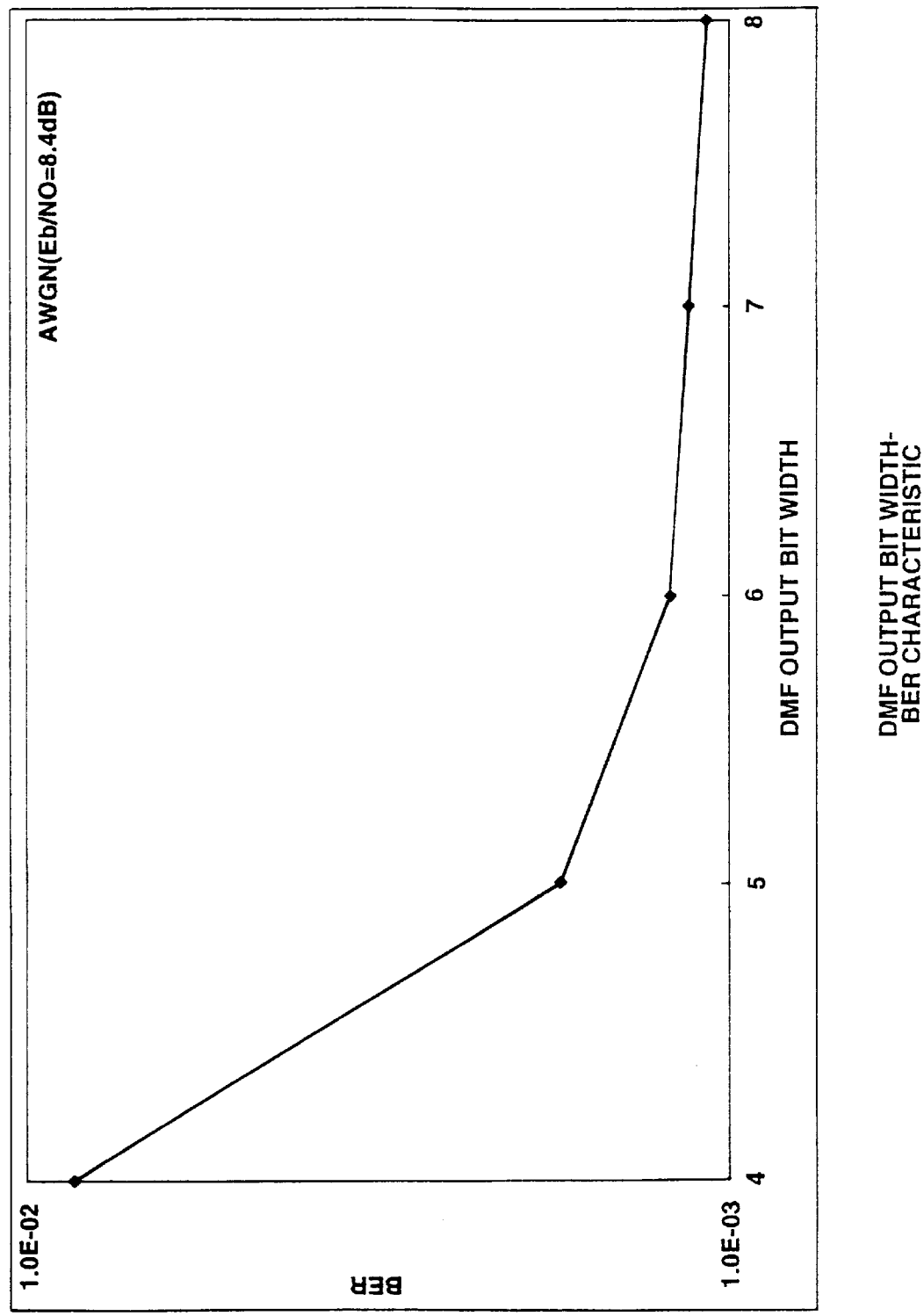

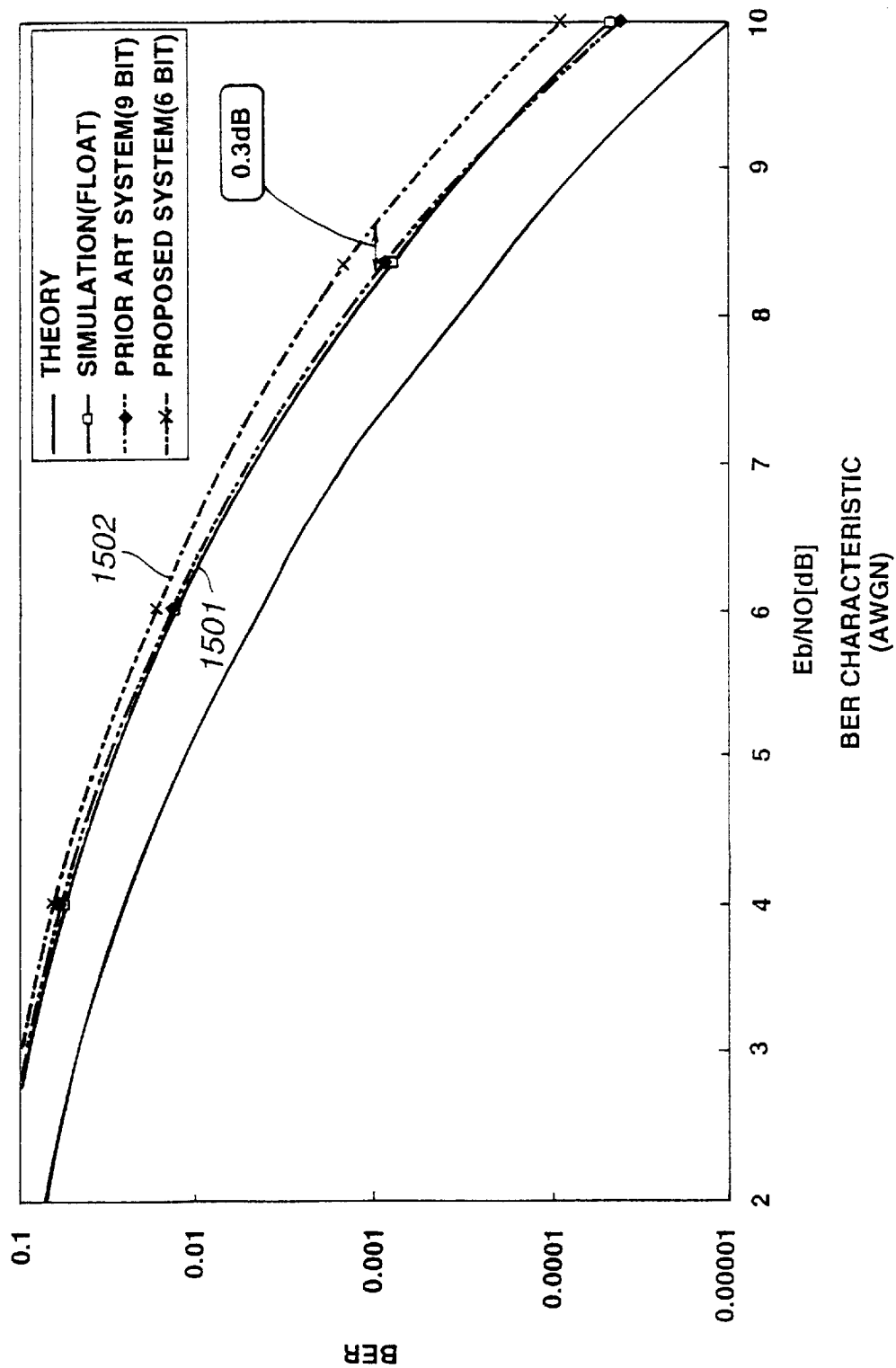

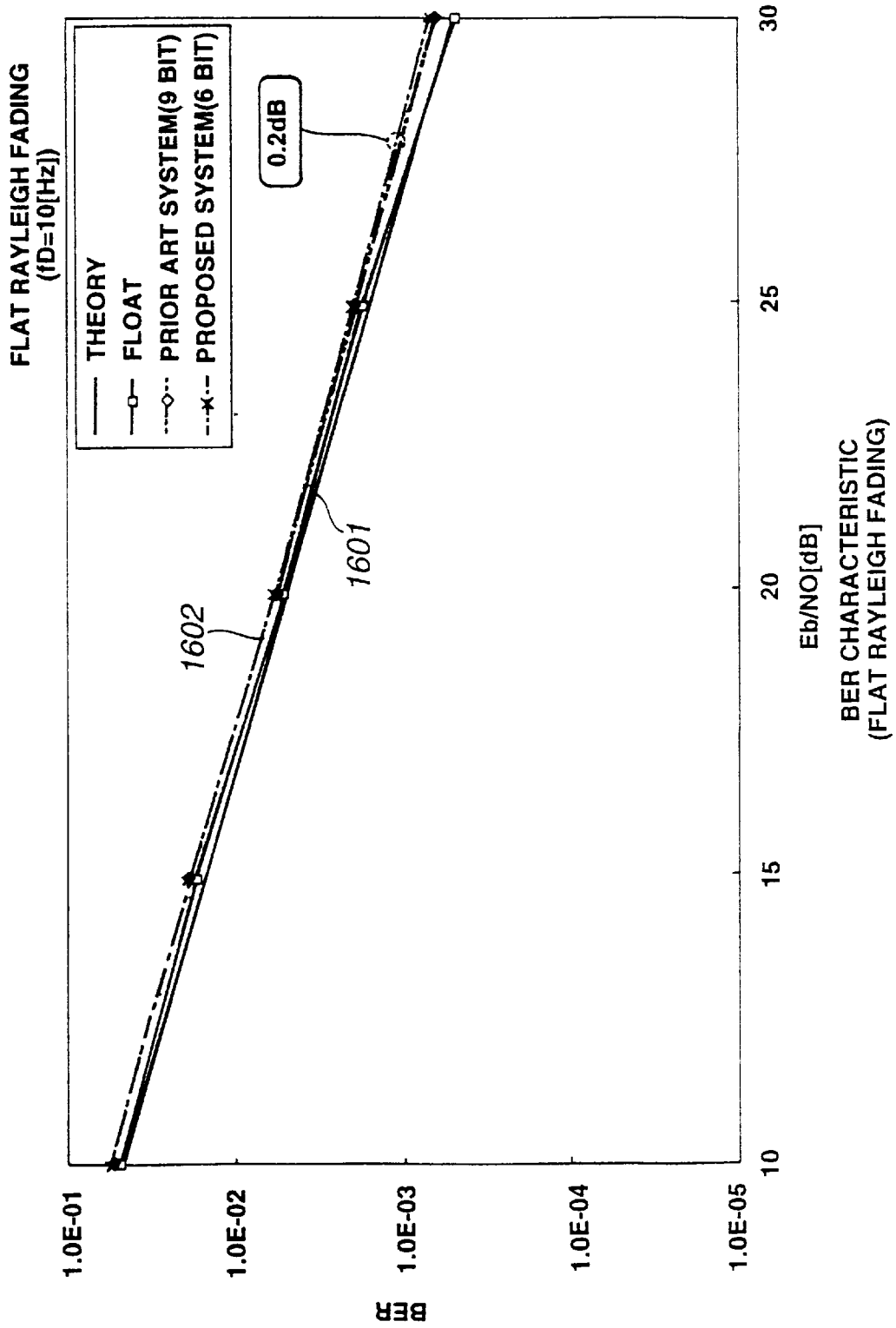

SPREAD SPECTRUM TRANSMITTER, SPREAD SPECTRUM RECEIVER AND SPREAD SPECTRUM COMMUNICATION METHOD AND AUTOMATIC GAIN CONTROL CIRCUIT FOR SPREAD SPECTRUM RECEIVER

BACKGROUND OF THE INVENTION

1. Field of the Invention

The present invention relates to a spread spectrum communication system and in particular, in a quadrature phase shift keying (QPSK) system, an object thereof is to provide a spread spectrum transmitter, spread spectrum receiver and spread spectrum communication method wherein mutual interference of the Q (quadrature) component and I (in-phase) component due to carrier frequency error is reduced. A further object is to provide a spread spectrum receiver in which the bit width of the demodulator is reduced and an automatic gain control circuit for the spread spectrum receiver.

2. Description of the Related Art

Of methods of generating a spread signal in spread spectrum, the spreading method called "direct sequence (DS)" involves spreading the spectrum of the transmission signal using a spreading code called a pseudo-random code. In general, spread spectrum modulation using the QPSK system may be divided into two stages, namely, primary modulation and secondary modulation. The primary modulation consists in quadrature phase modulation in which the raw digital data prior to modulation is divided into baseband signals that take values of ±1 every 2 bits and the respective divided data are modulated by a carrier wave offset in phase by 90°. The respective baseband signals are called the I signal and Q signal. In secondary modulation, the primary modulation signals (I signal and Q signal) obtained by quadrature phase modulation are respectively multiplied by PN sequence codes supplied from a PN sequence generator to produce a spread spectrum. In this context, a PN sequence means a random square wave that changes with a rate that is higher than the bit rate of the raw data. The duration of a single bit in the pseudo-random signal of this PN sequence is called one chip, and the length of this period is referred to as the chip duration (hereinbelow denoted by Tc). The secondary modulated transmission signals are transmitted after superimposed.

In general, a spread spectrum transmission signal that is transmitted by the QPSK system is demodulated by the following procedure. Specifically, the received signals are amplified by a front end amplifier and subjected to quadrature detection with carrier waves mutually different in phase by 90° by a quadrature detection circuit, being thereby converted into an Ir signal and Qr signal. Despreading is effected by multiplying these two baseband signals with spreading code supplied from a PN sequence generator identical with that used in transmission. In performing despreading, the phase difference (called the phase error) between the quadrature axis of the baseband signal contained in the transmission signal and the quadrature axis of the baseband signal obtained by quadrature detection must be minimised. Also, in clock recovery, synchronisation is established in the initial period of communication. Once synchronisation has been established, despreading of the PN sequence can be continued with the phase on synchronisation maintained using a delayed lock loop circuit (DLL).

Techniques of this type are disclosed in the following prior art references.

Japanese Patent Laid-Open (Kokai) No. H5-344093 discloses a technique in which a clock is recovered by detecting the peak of the sum of squares of the in-phase component and quadrature component of the output signal of a sliding correlator.

Japanese Patent Laid-Open (Kokai) No. H6-232838 discloses a spread spectrum receiver for obtaining a modulation system such that the amplitude of the spread spectrum transmission waveform cannot become 0.

Japanese Patent Laid-Open (Kokai) No. H6-244820 discloses a technique in which synchronisation capture and frequency error correction are performed by employing a plurality of despreading correlators.

Japanese Patent Laid-Open (Kokai) No. H7-107007 discloses a spreading code generating system in spread spectrum communication.

Japanese Patent Laid-Open (Kokai) No. H.7-131379 discloses a demodulating device for a spread spectrum communications receiver that demodulates a BPSK signal.

Japanese Patent Laid-Open (Kokai) No. H.7-140244 discloses a technique for synchronisation capture by sliding the phase of the spreading code until the correlation of the received baseband signal and spreading code is a prescribed value.

Japanese Patent Laid-Open (Kokai) No. H.7-283762 discloses a technique in which an SAW matched filter is employed as demodulator.

Japanese Patent Laid-Open (Kokai) No. H.7-288511 discloses a technique in which the frequency of a voltage-controlled oscillator is controlled by applying attenuation to the output of a correlator.

Japanese Patent Laid-Open (Kokai) No. H.8-149048 discloses a technique in which an SAW matched filter is employed in a modulation device and demodulator using the offset QPSK modulation system.

Also, other references include the following.

Japanese Patent Laid-Open (Kokai) No. H.3-101534 discloses a direct-sequence spread spectrum communication system and receiving device wherein quasi-synchronous detection is performed in order to make possible implementation of the circuit in LSI form by lowering the frequency band width of signal processing.

Japanese Patent Laid-Open (Kokai) No. H.7-183831 discloses a digital communications method and digital communications device in which equivalent multi-bit quantization and equivalent demodulation are performed by sampling by single-bit quantization of a direct-sequence modulated received signal. This device does not require an analogue-digital converter (A/D) or automatic gain control circuit (AGC).

Japanese Patent Laid-Open (Kokai) No. H.8-8782 discloses a direct-sequence spread spectrum communication system in which the input amplitude level of an A/D converter is optimised in response to C/N of the received signal by setting the value of the quantization level with respect to the input signal in A/D to a value adapted to the C/N; it is equipped with an AGC circuit.

Japanese Patent Laid-Open (Kokai) No. H.8-32487 discloses a spread spectrum communication system in which amplitude information identical with the QAM modulation system is conferred by applying a spread spectrum self-correlation characteristic, using a phase modulation system of fixed carrier amplitude.

Incidentally, Japanese Patent Laid-Open (Kokai) No. H.5-344093 discloses a technique of clock recovery by detecting the peak of the sum of squares of the output signal of a sliding correlator of the in-phase component and quadrature component, but, with this technique, if carrier frequency error or carrier phase error is present, clock recovery cannot be achieved.

Also, Japanese Patent Laid-Open (Kokai) No. H.6-244820 discloses a technique in which synchronisation capture and frequency error are performed by employing a plurality of despreading correlators; however, its layout is complicated since the number of correlators is doubled due to the use of a plurality of types of spreading code.

However, with a direct sequence spread spectrum system, although a correlator such as DMF (Digital Matched Filter) or SC (Sliding Correlator) is employed when despreading with the baseband at the receiving end, since these correlators perform addition of (spreading code length)× (oversampling number), there was the problem that the bit width of the output was increased. Accompanying this, there was the problem that the scale of the hardware became large, increasing power consumption.

SUMMARY OF THE INVENTION

The present invention was made with such problems in view;

an object thereof is to provide a spread spectrum transmitter, spread spectrum receiver and spread spectrum communication method wherein clock recovery can be achieved even when there is carrier frequency error or carrier phase error, notwithstanding its simple construction.

Also, an object of the present invention is to provide a spread spectrum transmitter, spread spectrum receiver and spread spectrum communication method wherein carrier frequency error correction can be performed in the baseband.

Also, there is provided a spread spectrum receiver and automatic gain control circuit for a spread spectrum receiver wherein the bit width of the demodulator can be reduced without adversely affecting the bit error rate. A further object is to combine this with size reduction and power saving.

According to the present invention, a method of spread spectrum communication using the QPSK modulation system comprises: a delay step of applying, to one of the IQ (In-phase, Quadrature phase) components, a time difference Td with respect to the other component (Tc<Td<T/2, where Tc is the spreading code chip period, and T is the symbol period); a modulation step of modulating the I component with a carrier signal and the Q component with a carrier signal to which is applied a prescribed phase difference; a transmission step of synthesising and transmitting the modulated IQ components; a reception step of receiving the transmitted signal; a demodulating step of demodulating the received signal with a carrier signal and carrier signal to which a prescribed phase difference has been applied into respective IQ components; and a decoding step of decoding the data using the vector of the received signal at time point t and the vector of the received signal at time point (t+Td).

The time difference Td is the time measured from the nearest symbol period T; the actual delay time can be set to any desired length. For example, Td could even be set to n times the symbol period T i.e. to (Tc<(Td−nT)<T)(n=1, 2, 3, 4, ... ). The condition Tc<Td is a condition to prevent the situation that, due to spreading of the peak of the correlation value, the peak and skirt overlap so that they cannot be separated (in other words, they interfere). Td<T/2 is the condition to prevent the situation that the peaks of the correlation values overlap at the same time-point.

According to the present invention, a spread spectrum receiver using the QPSK modulation system comprises: a delay circuit that applies a time difference Td (Tc<Td<T/2, where Tc is the spreading code chip period and T is the symbol period) to one component of the IQ components with respect to the other component; a modulation circuit that modulates the I component with a carrier signal and modulates the Q component with a carrier signal to which a prescribed phase difference has been applied; and means for synthesis that synthesises the modulated IQ components.

According to the present invention a spread spectrum receiver using the QPSK modulation system comprises: means for receiving that receive a signal transmitted with a prescribed time difference Td applied between the IQ components; a demodulating circuit that demodulates the IQ components by modulating the received signal with a carrier signal and a carrier signal that has been given a prescribed phase difference; and a decoding section that decodes the data using the vector of the received signal at time point t and the vector of the received signal at time point (t+Td).

According to the present invention a spread spectrum communication receiver using the QPSK modulation system comprises: a quadrature detection circuit that converts an intermediate frequency signal obtained from a received signal to quadrature baseband signals; two correlators that respectively calculate the correlation between the baseband signals and spreading code; an automatic gain control circuit comprising means for calculating valid bits that calculate the number of valid bits in each symbol period of the baseband signal and means for data selection that extract, based on the calculated valid bits, data of n (m>n) bits from the m-bit data respectively indicating the I component and Q component of the correlation output from the correlators; and a decoding circuit that decodes the data by calculating the phase from the ratio of the I component and Q component using the n-bit data obtained by the automatic gain circuit and that performs differential decoding of the calculated phase.

According to the present invention an automatic gain control circuit arranged on a signal path in a spread spectrum communication receiver employing a QPSK modulation system between the respective outputs of two correlators that calculate the correlation between a baseband signal and spreading code and a phase calculator that calculates the phase from the ratio of the I component and the Q component of the correlation values, comprises: means for calculating valid bits that calculates the number of valid bits in each symbol period of the baseband signal; and means for data selection that extract data of n (m>n) bits from m-bit data indicating respectively the I component and Q component of the correlation values output from the correlators, based on the calculated valid bits.

BRIEF DESCRIPTION OF THE DRAWINGS

FIG. 10 is a block diagram illustrating schematically a receiver according to a second embodiment of the present invention;

FIG. 11 is a block diagram of an AGC circuit according to the second embodiment of the present invention;

FIG. 12 is a diagram given in explanation of an example of a threshold value employed by a comparator according to the second embodiment of the present invention;

FIG. 13A to FIG. 13C are diagrams given in explanation of the data obtained by an AGC circuit according to the second embodiment of the present invention;

FIG. 14 is a diagram showing the results of simulation of the relationship between DMF output bit width and bit error rate (BER) according to the second embodiment of the present invention;

FIG. 15 is a view showing the results of simulation of BER in an AWGN environment according to the second embodiment of the present invention; and FIG. 16 is a view showing the results of BER simulation under a fading environment according to the second embodiment of the present invention.

DESCRIPTION OF THE PREFERRED EMBODIMENT

First Embodiment of the Invention

In the first embodiment of the present invention, in a spread spectrum digital radio communication system, at the transmission end, QPSK modulation is performed of an in-phase component and a quadrature component to which a time difference Td is applied by a delay circuit; the sum of the signal delayed by Td and a signal not subjected to time delay is found by a clock recovery circuit at the receiving end; and synchronisation acquisition and synchronisation tracking are performed in accordance with the peak position of this. Also, correction of the carrier frequency error is performed in the baseband using the output signal of a plurality of sliding correlators that find the mutual correlation with the spreading code respectively for the in-phase component and quadrature component.

The first embodiment of the present invention is described below with reference to the drawings.
<Overall Description>

Figure 1:
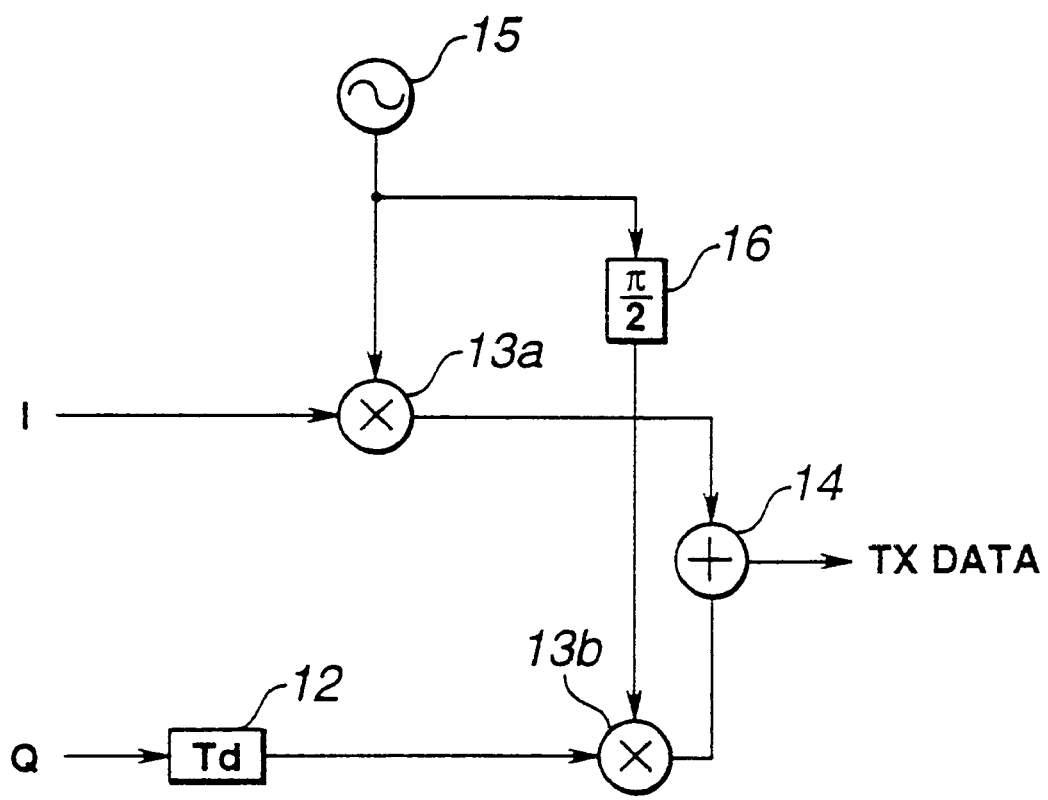
FIG. 1 is a functional block diagram of major parts of a transmitter according to a first embodiment of the present invention.

FIG. 1 shows a schematic block diagram of a transmitter that performs spectrum spreading using the QPSK system.

A transmitter comprises: a delay circuit 12 that, of two baseband signals I, Q subjected to spectrum spreading, delays the Q signal by a fixed time Td (Tc<Td<T/2, where Tc is the spreading code chip period and T is the symbol period); multipliers 13a, 13b that respectively modulate baseband signals I, Q with carrier waves that are mutually in quadrature; and an adder 14 that outputs a transmission signal TX DATA obtained by adding the modulated I signal and Q signal. The transmission signal TX DATA is supplied to a transmission antenna, not shown, through a radio frequency power amplifier, not shown, and the transmission signal is then radiated into space. The transmitter provides a local oscillator 15 that generates the carrier wave and a phase shifter 16 that supplies the phase of the carrier wave to a Q channel multiplier 13b, offset by $\pi n/2$ (90°).

It should be noted that, although, in the transmitter of FIG. 1, the Q signal was delayed by Td, it would be possible, contrariwise, to delay the I signal. Also, for the spectrum spreading code, any desired spreading code could be employed, for example M sequence, Gold sequence, or Baker sequence.

It should be noted that a half-chip offset QPSK communication system of a construction that is prima facie similar to that of FIG. 1 is known. In this system, one component is delayed by a half chip (Tc/2), using a delay circuit. However, in this half-chip offset QPSK, offset is effected by the amount of a half chip only, in order to narrow the bandwidth, in the same way as in ordinary offset QPSK; the object is different from the case of the first embodiment of the present invention and the range of delay is also different.

Figure 2:
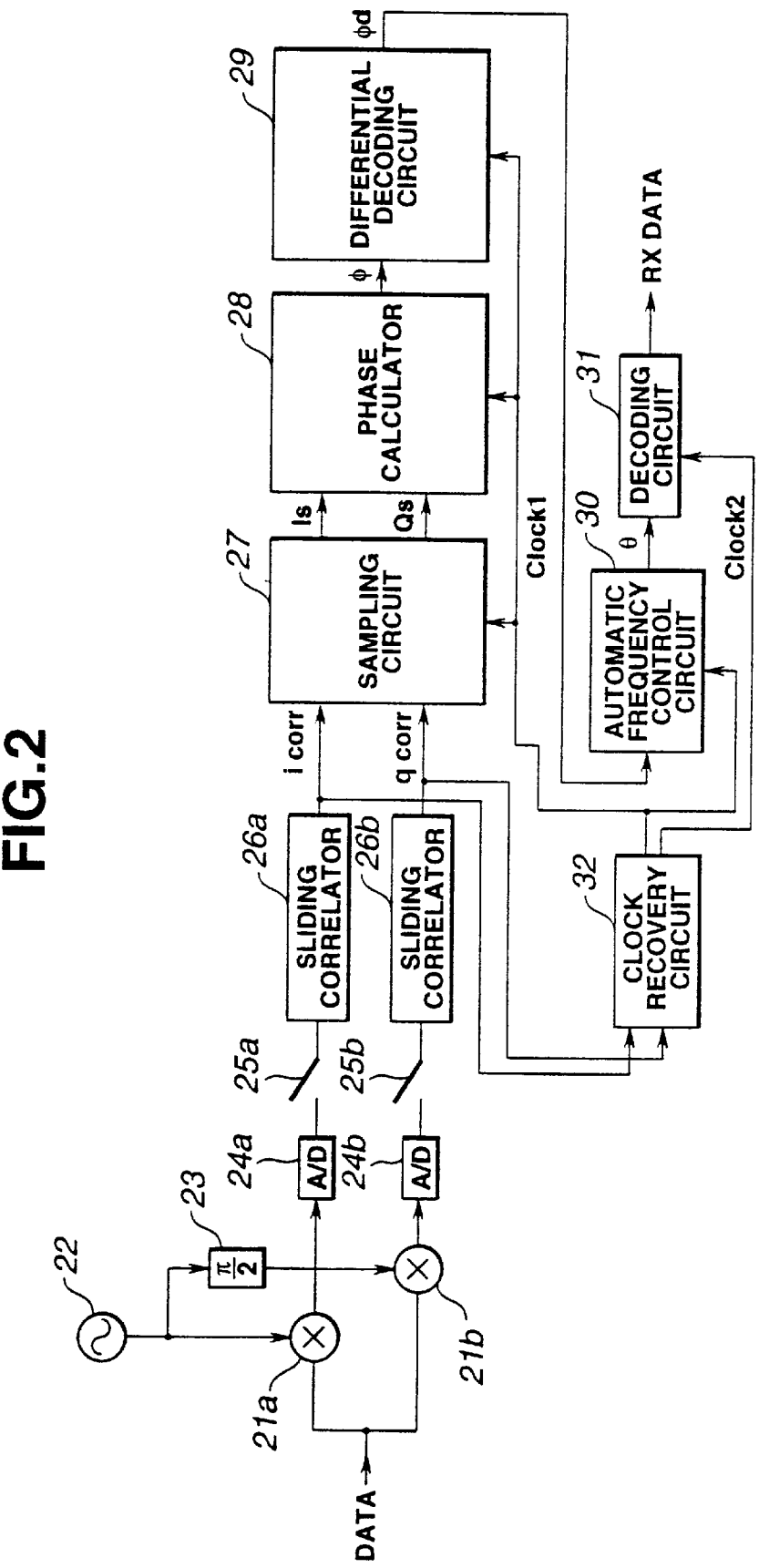
FIG. 2 is a functional block diagram of major parts of a receiver according to a first embodiment of the present invention.

FIG. 2 shows a schematic block diagram of a receiver corresponding to the transmitter of FIG. 1.

The transmission signal from the transmitter of FIG. 1 is received by a receiving antenna of a receiver, not shown, and is converted to an intermediate frequency signal IF DATA in the front-end, not shown. The IF DATA is branched into two, which are respectively input to multipliers 21a, 21b. Multiplier 21a is supplied with a carrier wave from a local oscillator 22 and multiplier 21b is supplied with a carrier wave whose phase is offset by an amount $\pi n/2$ by a phase shifter 23. Quadrature detection is performed in multipliers 21a, 21b and an I-channel signal and Q-channel signal are respectively output. Analogue-digital (A/D) converters 24a, 24b respectively convert the I-channel signal and Q-channel signal into digital signals. The digital signal of the converted I and Q channels are respectively input to samplers 25a, 25b where they are oversampled with a clock of for example four times the chip rate.

Sliding correlators 26a, 26b find and output the correlation between the spreading code and input data and comprise means for storage (not shown) that respectively store the spreading code therein; shift registers (not shown) that receive and successively shift input data; and calculators that find the mutual correlation between the means for storage and the shift register.

Sampling circuit 27 respectively samples the outputs i corr, and q corr of sliding correlators 26a, 26b, using the clock (clock 1) from clock recovery circuit 32. In this first embodiment of the present invention, an accurate sampling clock is generated in clock recovery circuit 32, so the IQ correlation value is correctly sampled, so accurate subsequent operation is possible.

Phase calculator 28 calculates phase $\phi$ using the correlation values Is and Qs that were sampled under the control of clock 1. Differential decoder 29 finds the amount of change $\phi d$ of phase between symbol periods using clock 1.

Automatic frequency control circuit (AFC) 30 calculates and corrects carrier frequency error from the amount of change $\phi d$ of the phase, and outputs the corrected amount of phase change $\theta$.

Decode circuit (decision) 31 decodes the data using clock 2 that is generated together with clock 1 by clock recovery circuit 32.

Clock recovery circuit 32 performs synchronisation acquisition and synchronisation tracking on the basis of the quadrature component q corr and in-phase component i corr of the correlation value, and outputs clock 1 and 2.

<Description of the Clock Recovery Circuit>

Figure 3:
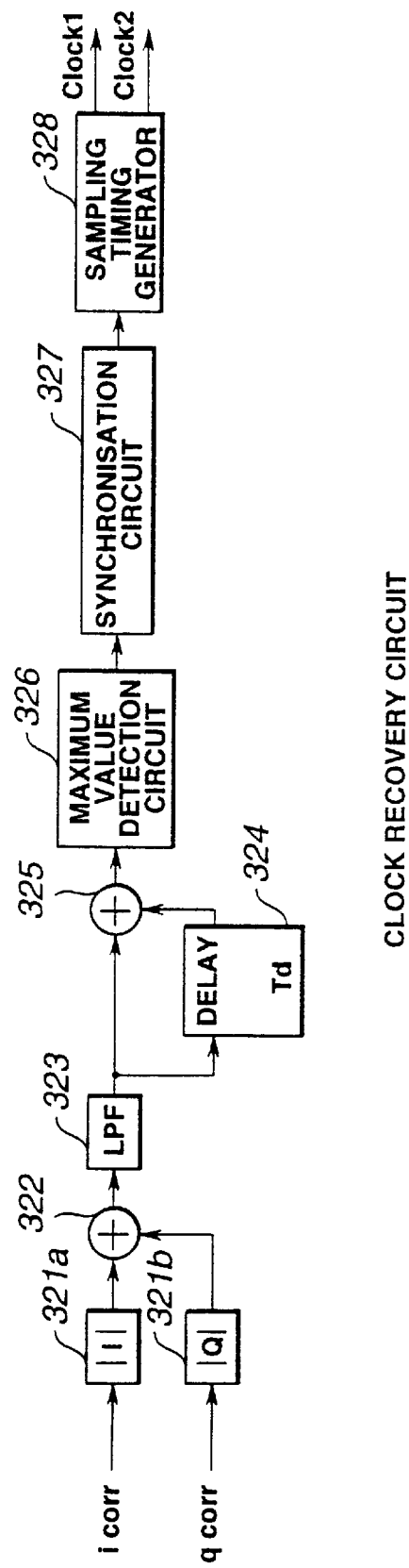
FIG. 3 is a functional block diagram of a clock recovery circuit according to a first embodiment of the present invention.

Next, a detailed description will be given of clock recovery circuit 32. FIG. 3 shows a detailed block diagram of clock recovery circuit 32 of FIG. 2.

Absolute value circuits 321a, 321b find the absolute values of the quadrature component q corr and in-phase component i corr of the correlation value that is respectively output by sliding correlators 26a and 26b. Adder 322 adds the outputs of absolute value circuits 321a, 321b. Low pass filter (LPF) 323 removes the high frequency components of the output of adder 322. Adder 325 adds the output signal of LPF 323, which is delayed corresponding to the delay time Td of delay circuit 12 of the transmitter by a delay circuit 324 and the output of LPF 323, which is not delayed. Peak detector 326 detects the peak value contained in the output of adder 325. Synchroniser 327 controls the peak position by comparing the position detected by peak detector 326 with the already-held peak position. Sampling timing generator 328 generates the pulse signal (clock 1), which is the repetition period of Td and (T−Td) and pulse signal (clock 2) of period T/2 by using the peak position that is held by synchroniser 327.

Figure 6:
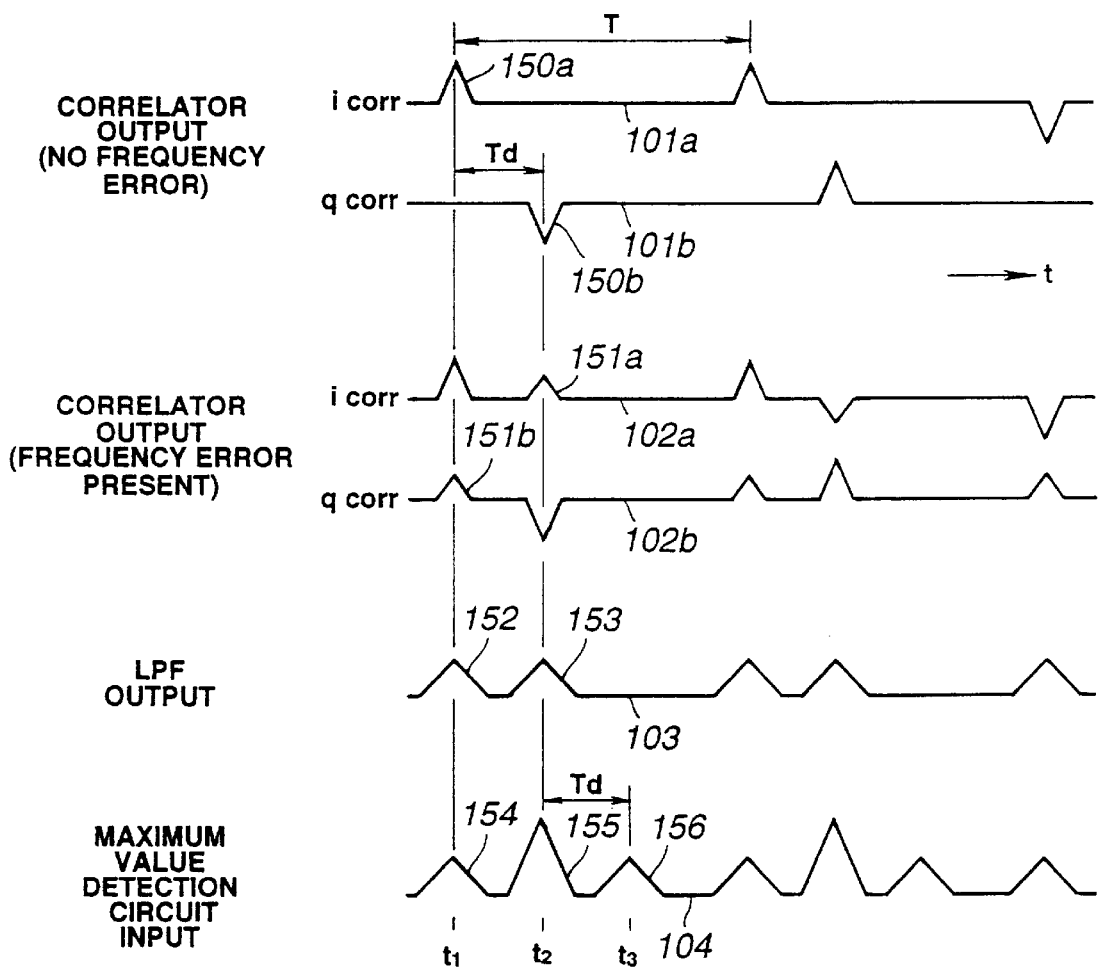
FIG. 6 is a timing chart given in explanation of the operation of the clock recovery circuit according to the first embodiment of the present invention.

Next, the operation will be described with reference to the timing chart of FIG. 6 and FIG. 7. Sliding correlators 26a, 26b output signals for example as shown at 101a and 101b of FIG. 6. In FIG. 6, the vertical axis represents the correlation value and the horizontal axis represents the time. Looking at the I signal, there is a peak 150a (time point t1) of the correlation value at symbol period T. In the same way, looking at the Q signal, there is a peak 150b (time point t2) of the correlation value likewise at the symbol period T. Peak 150b is delayed by a time Td (t2−t1=Td) compared with peak 150a. This time Td corresponds to the delay time of delay circuit 12 at the transmitting end.

However, it may happen that the signal received by the receiver contains a frequency error between transmission and reception. In this case, leakage occurs between the I signal and the Q signal. When this happens, apart from the peak 150a at the correct position of time point t1 in relation to the I signal, a peak 151a representing leakage of the Q signal is generated at time point t2. Likewise regarding the Q signal a peak 151b representing leakage of the I signal is generated at time point t1. Under these circumstances, a plurality of peaks are present within a single symbol period, so the correct clock cannot be recovered.

However, with this first embodiment, the clock can be correctly recovered, even in such circumstances, by the following processing. The signal that has passed through absolute value circuits 321a, 321b, adder 322 and LPF 323 is as shown by 103 in FIG. 6. Now delay circuit 324 of FIG. 3 delays signal 103 by a time Td and adder 325 adds these signals after the delay to signal 103. The output of adder 325 is therefore as shown by signal 104. That is, peaks 152 and 153 are added to obtain a peak 155 (the sum of peak 154 and peak 156) that is larger than the other peaks 154 and 156. This peak 155 is generated with every symbol period T, so a correct clock can be recovered by using this.

Peak detector 326 detects this peak 155 and finds its position t2. Specifically, the following processing is performed. Peak detector 326 holds the peak position based on the previous results. This peak position that is held and the peak position that is detected are compared and if they are the same this position is taken as the peak position. If they are not the same, an intermediate value of these two is taken as the peak position. For example, if the symbol period T is defined by chip numbers 0 to 39, if the chip number of the held position is 10 and the chip number of the detected position is 5, the output of peak detector 326 is taken as chip number 9. The reason for this processing is to prevent operation becoming unstable due to the peak value being tracked too precisely if the peak position changes suddenly for some reason or other. Even if a peak is generated at another time point due to the effect of noise for example, the effect of a unwanted peak is made relatively small by processing as described above.

Figure 7:
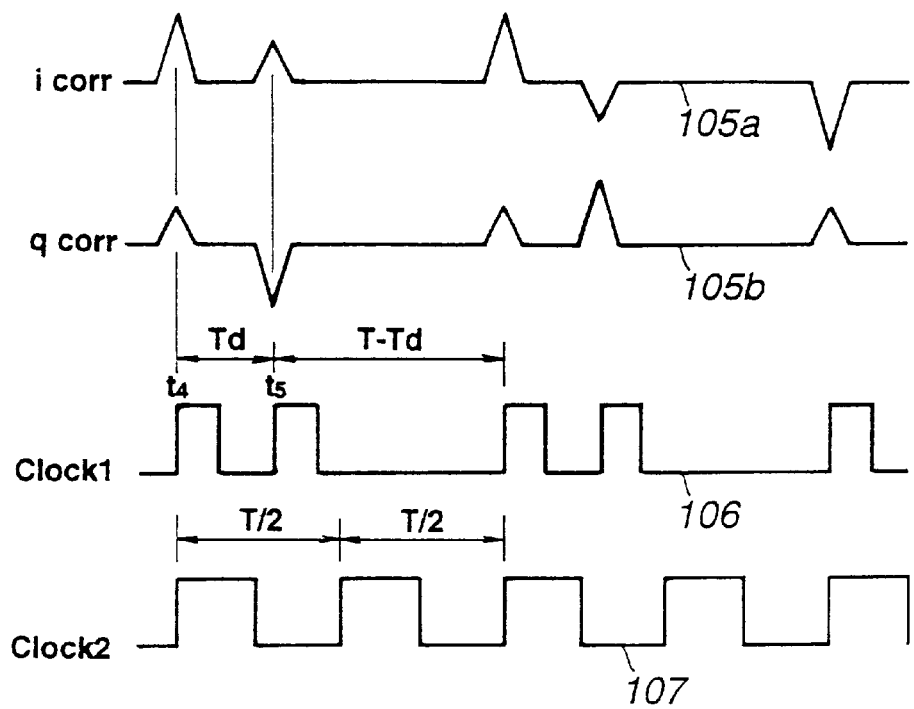
FIG. 7 is a timing chart given in explanation of the operation of the clock recovery circuit according to the first embodiment of the present invention.

Sampling timing generator 328 generates a timing signal as shown in FIG. 7 using the detection results of peak detector 326. As shown by reference symbol 106, clock 1 has a period of T and shows two pulses rising respectively at the peak position of signal I and the peak position of signal Q. Clock 1 is employed for accurate sampling of the IQ signal. Clock 2 is synchronised with the symbol period and is a pulse signal 107 that repeats with a period T/2 of half the symbol period T. Clock 2 is employed by decision circuit 31.

<Description of Reception Processing>

Reception processing will now be described.

Phase calculator 28 calculates the phase θ based on the I and Q correlations sampled under the control of clock 1 which is accurately recovered as described above. If the signal at a timing t4 in advance of clock 1 is Is(t4) and Qs(t4) and the signal at timing t5 after clock 1 is Is(t5), Qs(t5), the detected phase φ at timings t4, t5 are respectively given by the following equations:

$$\phi(t4) = \arctan(Qs(t4)/Is(t4)) \quad (1)$$
$$= \theta d(t4) + \Delta\theta(t4)$$

$$\phi(t5) = -\arctan(Is(t5)/Qs(t5)) \quad (2)$$
$$= \theta d(t5) + \Delta\theta(t5)$$

Phase calculator 28 outputs the calculated φ.

Figure 4:
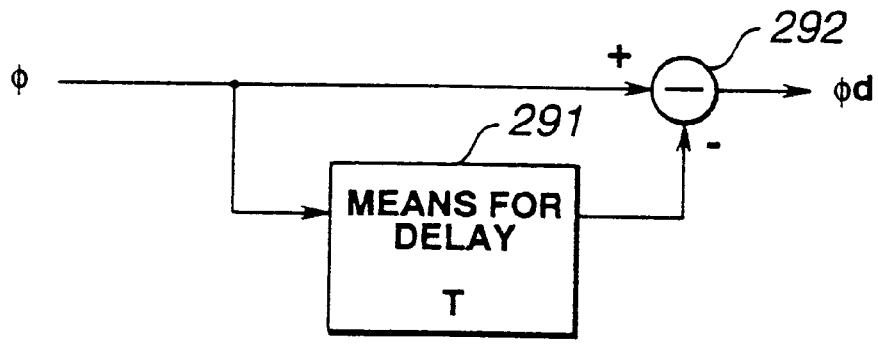
FIG. 4 is a functional block diagram of a differential decoding circuit according to a first embodiment of the present invention.

The internal construction of differential decoder 29 is as shown in FIG. 4; it receives the output φ of phase calculator 28 and is thus able to find the phase difference φd between symbol periods by means for delay 291 and subtractor 292. Specifically, it finds the difference with the signal one symbol previous.

$$\phi d(t) = \phi(t) - \phi(t-T) \quad (3)$$
$$= \{\phi d(t) - \phi d(t-T)\} + \{\Delta\theta(t) - \Delta\theta(t-T)\}$$
$$= \theta + d\theta/dt$$

Figure 5:
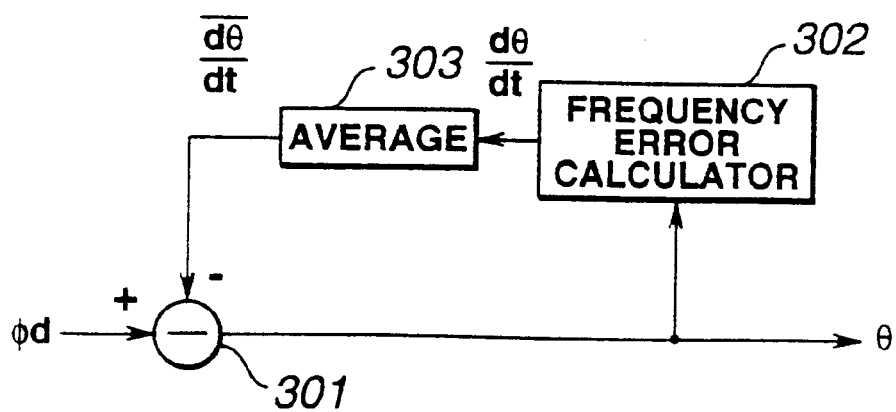
FIG. 5 is a functional block diagram of an automatic frequency control circuit according to a first embodiment of the present invention.

As shown in FIG. 5, the internal structure of automatic frequency control circuit 30 comprises a subtractor 301, frequency error calculator 302, and averaging processor 303. Frequency error calculator 302 receives φd from differential decoder 29 and finds the frequency error dθ/dt. Averaging processor 303 finds the average of the frequency errors.

This operation will now be further described in more detail. Frequency error calculator 302 performs the following processing. If there is no frequency error, φd is 0 or π. If there is a frequency error, φd is $$\phi d = \theta + d\theta/dt \quad (4)$$

where θ=0 or π.

The frequency error dθ/dt can thereby be found using the following equations:

$$\text{when } 0 \leq \phi d < \pi/2, \; d\theta/dt = \phi d \quad (5)$$
$$\text{when } \pi/2 \leq \phi d < 3\pi/2, \; d\theta/dt = \phi d - \pi \quad (6)$$

when $3\pi/2 \leq \phi d < 2\pi$, $d\theta/dt = \phi d - 2\pi$ (7)

Figure 8:
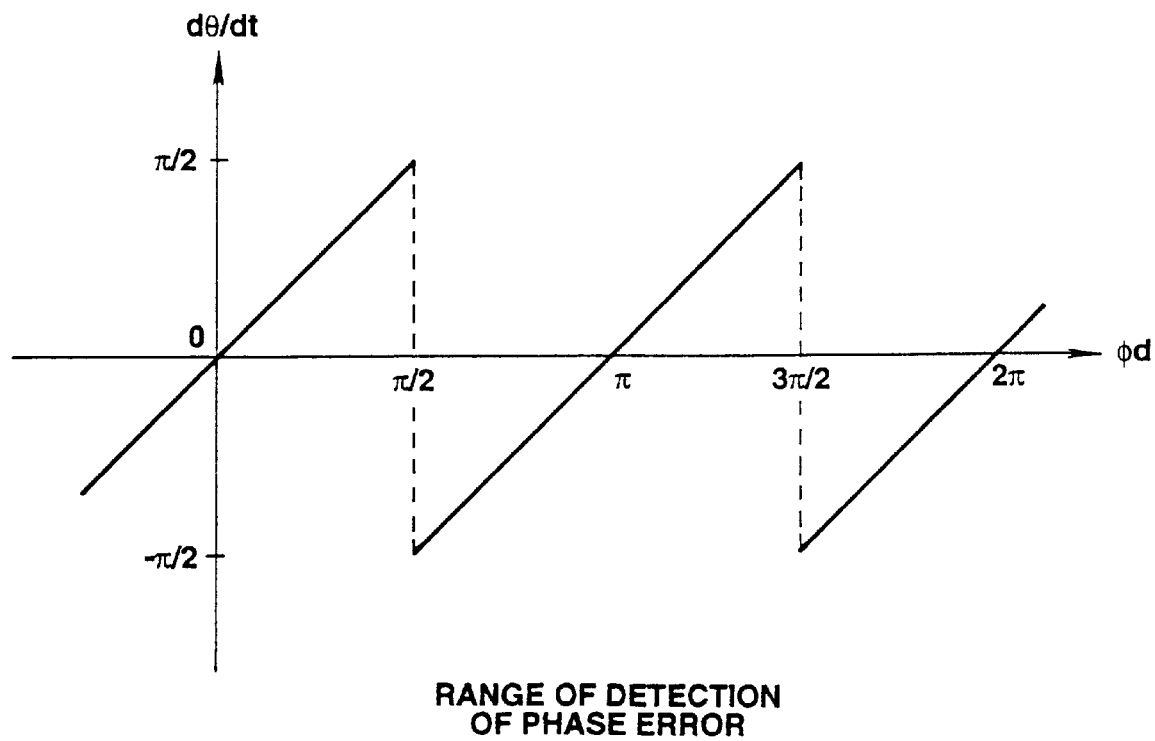
FIG. 8 is a diagram illustrating the range of detection of phase error according to a first embodiment of the present invention.

The detection range of phase error is shown in FIG. 8.

Averaging processor 303 is for example an LPF which averages the input signal dθ/dt by removing noise components, and outputs the average value of the frequency error dθ/dt. Subtractor 301 subtracts the average value of frequency error dθ/dt from the phase difference φd.

Decision circuit 31 outputs the following values with respect to input signals $\theta(0 \leq \theta < 2\pi)$ from automatic frequency control circuit 30.

when $0 \leq \theta < \pi/2$, $3\pi/2 \leq \theta < 2\pi$, "1" (8)

when $\pi/2 \leq \theta < 3\pi/2$, "0" (9)

Decision circuit 31 outputs this data as received signal RX DATA.

The delay time Td in the transmitter can be set within the following range. Specifically, if Tc is the spreading code chip period and T is the symbol period, Tc<Td<T/2 (10)

Since this expression is referred to the phase that is most advanced it can be applied both to the case where the Q signal is delayed and contrariwise to the case where the I signal is delayed, as described in this embodiment. The meaning of this expression is as follows. If Td<Tc, since there is some degree of spreading of the peak of the correlation value due to the oversampling, the peak and the skirt overlap, making separation impossible (i.e. they interfere), so the true period cannot be detected and the AFC function does not work properly. Also, if Td=T/2, the peaks overlap at the same time point, so the method of FIG. 6 cannot be implemented. However, it should be noted that, so long as Tc<Td and Td≠T/2 are satisfied, depending on where the reference point is taken, the case where Td>T/2 could also be included.

<Explanation of the Principles of Operation>

The operation was explained in the above description using a specific constructional example of the equipment; its principles will now be described with reference to FIG. 9.

Figure 9A:
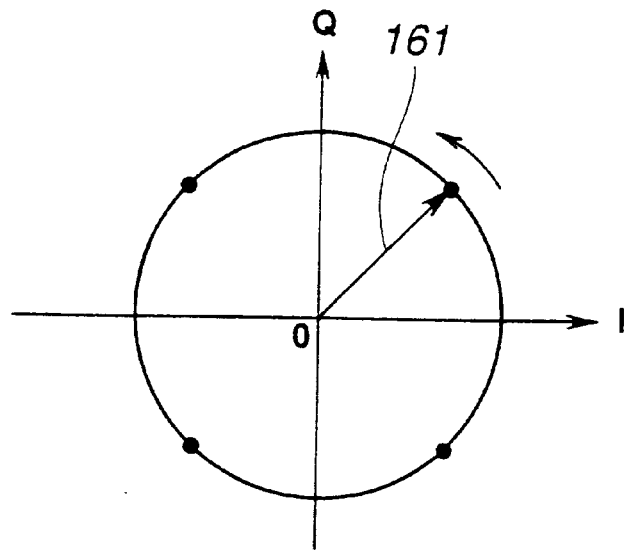
FIG. 9A and FIG. 9B are diagrams given in explanation of the principles of operation of the present invention.

As is well known, if the IQ signal of quadrature phase shift keying (QPSK) is expressed in orthogonal co-ordinates, the result is as shown in FIG. 9A. If there is no carrier frequency error between transmission and reception, the vector 161 of the IQ signal executes transitions between four points (45°, 135°, 225°, and 315°) on a circle. However, if there is a carrier frequency error (Δω) between the transmission and reception [frequencies], vector 161 rotates from its original position by an amount ∫Δωdt. For example, if it rotates until vector 161 coincides with the I axis, the Q component cannot be detected. If, when performing reception operation using the correlation of the I component and Q component, the Q correlation is not used, the error rate characteristic is adversely affected.

Figure 9B:
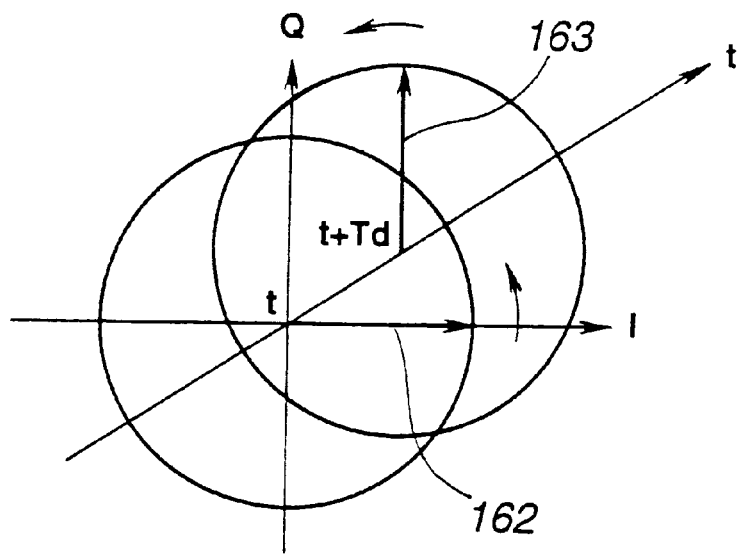

In the present invention, transmission is effected with these separated by applying a fixed time difference between the I and Q components of vector 161. The way in which this is done is shown in FIG. 9B. For example, if the Q component is delayed by a time Td (0<Td<T), the I component vector 162 is transmitted at time point t while the Q component vector 163 is transmitted at time point (t+Td). Rotation of vectors 162, 163 still occurs just as in the case where a time difference is not applied, but, for the following reasons, this effect is reduced compared with the case where a time difference is not applied. Since the carrier frequency error is practically fixed, the amount of phase rotation at time point t and the amount of phase rotation at time point (t+Td) are practically equal. On the other hand, noise is random, so the effect of noise can be removed by averaging the amounts of phase rotation of the I component and Q component, thereby making it possible to perform correction by finding the carrier frequency error.

As described above, with this first embodiment of the present invention, in a method of spread spectrum communication using the QPSK modulation system, transmission is effected with a prescribed time difference Td applied to the I component and Q component, so that data decoding is effected at the receiving end using the vector of the received signal at time point t and the vector of the received signal at time point (t+Td), so even if there is a carrier frequency error, mutual interference between the in-phase component and quadrature component cannot occur, enabling the correlation with the spreading code to be calculated.

Also, with this invention, clock recovery is performed using the vector of the received signal at time point t and the vector of the received signal at time point (t+Td), so, even if there is a carrier frequency error, synchronisation acquisition and synchronisation tracking can be performed.

Also, with the present invention, accurate data decoding is possible since the carrier frequency error is found from the vector of the received signal at time point t and the vector of the received signal at time point (t+Td) and correction for this is performed in the baseband.

Second Embodiment of the Invention

Description concerning a second embodiment of the present invention is added below. In this embodiment, QPSK modulation is performed at a receiver, not shown, of an in-phase component and quadrature component to which a time delay Td has been applied by a delay circuit.

<Overall Description>

FIG. 10 is a block diagram showing schematically a receiver corresponding to a transmitter, not shown.

The received signal from the transmitter, not shown, is received by a receiving antenna, not shown, of the receiver and converted into an intermediate frequency signal (IF) DATA in the front end, not shown. DATA is branched into two, which are respectively input to multipliers 21a, 21b. Also, multiplier 21a is supplied with a carrier wave from local oscillator 22, while multiplier 21b is supplied with the carrier wave offset in phase by π/2 by phase shifter 23. Quadrature detection is performed in multipliers 21a, 21b and an I channel signal and Q channel signal are respectively output. Analogue/digital (A/D) converters 24a, 24b respectively convert the I-channel signal and Q-channel signal to digital signals. The converted I and Q channel digital signals are respectively input to DMFs (Digital Matched Filters) 33a, 33b and to AGC 34.

DMF 33a and 33b find the correlation of the spreading code and the input data and output the result.

Phase calculator 28 calculates the phase φ from correlation values Is and Qs that are sampled under the control of clock 1. Differential decoder 29 finds the amount of change φd of phase between symbol periods under the control of clock 1.

Automatic frequency control circuit (AFC) 30, under the control of clock 1, calculates the carrier frequency error from the amount of change φd of phase and outputs a corrected amount of change of phase θ.

Decision circuit 31 performs data decoding using the clock 2 generated by clock recovery circuit 32 together with clock 1.

Clock recovery circuit 32 performs synchronisation capture and synchronisation tracking using the quadrature component q corr and in-phase component i corr, and outputs clocks 1 and 2.

As shown in FIG. 10, automatic gain control (AGC) circuit 34 is provided downstream of DMF 33a and 33b. DMF 33a and 33b are constituted to implement despreading. As to the function of the phase calculator 35, in this embodiment, ROM (Read Only Memory) in which the phase angle is stored beforehand is employed for calculation of the phase angle φ (see equation (1) and equation (2), given later). The data i corr indicating the in-phase component of the correlation and the data q corr indicating the quadrature component of the correlation may be thought of as being respectively m-bit data.

In accordance with the data from A/D converters 24a, 24b, AGC circuit 34 obtains data i agc and q agc of n (m>n) from the m-bit data i corr and q corr that it has received, and outputs the data obtained to phase calculator 35 and clock recovery circuit 32.

<AGC Circuit>

Next, the construction of AGC circuit 34 in the present embodiment will be described in more detail with reference to FIG. 11. As shown in FIG. 11, AGC circuit 34 comprises: absolute value circuits 341a, 341b that respectively receive outputs from A/D converters 24a, 24b and calculate the absolute values of the received data; a maximum value detection circuit 342 that receives data from absolute value circuits 341a and 341b and detects the maximum value of these; a comparator 343 that compares the maximum value supplied from maximum value detection circuit 342 with a prescribed threshold value; and selectors 344a, 344b that respectively extract n-bit data (i agc and q agc) from m-bit data (i corr and q corr) in accordance with the output from comparator 343.

Absolute value circuit 341a is supplied with data consisting of the I-channel signal obtained by quadrature detection in multiplier 21a converted to digital form; absolute value circuit 341b is supplied with data consisting of the Q-channel signal obtained in multiplier 21b converted to digital form. These absolute value circuits 341a and 341b respectively obtain the absolute value of quadrature component q and in-phase component i.

The absolute values obtained by absolute value circuits 341a, 341b are supplied to maximum value circuit 342. Maximum value circuit 342 synchronises with the recovered symbol period and detects the maximum value of these values. The means/method for removal of the effect of noise in order to prevent a value that instantaneously becomes transiently large due to noise from being detected as a maximum value by the maximum value circuit 342, a minimum continuation time may be set, the value in question being detected as maximum value by maximum value circuit 342 only if this value is maintained for a time exceeding the minimum continuation time.

The maximum value that is output in synchronism with the symbol timing is compared by comparator 343 with a prescribed threshold value. FIG. 12 is a view given in explanation of an example of a threshold value employed by such a comparator 343 in this embodiment. In this example, the input bit number to the DMF is 6 (of these, the most significant bit is a code bit); the spreading ratio employed in calculation in the DMF is 11; the oversampling number is 2, and the number of output bits of the DMF is 11. In this example, the absolute value of the input data to the DMF is: 0≦|input value|≦31. On the other hand, taking into account the spreading ratio and oversampling number, the absolute value of the output data from the DMF is: 0≦|output value|≦682 (=31×11×2).

Accordingly, taking into account the valid bits of the absolute value of the output value, if 24≦|input value|≦31, the absolute value of the output data can be expressed by about 10 bits. This is because 507 (1FB (HEX))≦|output value|≦682 (2AA (HEX)). Also, if 12≦|input value|≦23, the absolute value of the output data can be represented by about 9 bits. This is because 243 (OE9 (HEX))≦|output value|≦506 (1FA (HEX)). Furthermore, if 6≦|input value|≦11, the absolute value of the output data can be expressed by about 8 bits. This is because 111 (06F (HEX)) ≦|output value|≦242 (OE8 (HEX)). Likewise, if 3<|input value|≦5, |input value|≦2, or|input value|≦1, the absolute value of the output data can be respectively expressed by about 7 bits, about 6 bits or about 5 bits. Consequently, if the sign bit (1 bit) is added, the valid bit number of the DMF output data is as shown in the "valid bit column" of FIG. 12.

Accordingly, in the present embodiment, the data level (valid bit number) that is output from DMF 33a, 33b can be estimated by classifying the levels of the maximum values of the input data using the plurality of threshold values described above, by comparator 343. Comparator 343 outputs the result of the comparison (for example the valid bit number i.e. the maximum number of bit places excluding the sign bit) to selectors 344a, 344b.

In selectors 344a, 344b respectively, the sign bit and succeeding (n−1) bit data are selected so as to include valid bits from the n-bit output from DMF, and the n-bit data selected (i agc and q agc) are output.

For example, in the example described above, if the absolute value of the input data is 24≦|input value|≦31, as shown in FIG. 12, the valid bits are 11 bits, so 6-bit data consisting of 5 bits continuing from the 10th bit and the sign bit (most significant bit) are respectively selected by selectors 344a and 344b and 6-bit data (i agc and q agc) are output (see FIG. 13A).

Also, if the absolute value of the input data is 12≦|input value|≦23, since the valid bits are 10 bits, 6-bit data consisting of 5 bits continuous from the 9th bit and the sign bit (most significant bit) are output (see FIG. 13B).

Likewise, if the absolute value of the input data is 6≦|input value|≦11, since the valid bits are 9 bits, 6-bit data consisting of the 5 bits continuous from the 8th bit and the sign bit (most significant bit) are output (see FIG. 13C).

Thus, by means of AGC circuit 34, from the 11-bit data (i corr and q corr), of the sign bit and valid bits, 6-bit data comprising the most significant 5 bits (i agc and q agc) can be obtained. It should be noted that, although an ordinary AGC circuit comprises a feedback loop, the AGC circuit of the present embodiment does not comprise a feedback loop. It therefore has the features of stability and that an effect at a given time point converges within a restricted time.

<Operation of Circuitry Downstream of AGC Circuit 34>

In phase calculator 35, the outputs i agc and q agc from AGC circuit 34 are respectively sampled under the control of clock (Clock 1) from clock recovery circuit 32; output (corresponding phase angle) is then obtained from a ROM (not shown) that stores phase angle, addressed by the sampled IQ correlations Is and Qs. In addition, phase calculator 35 can find the phase difference φd between symbol periods (see equation (3)).

It should be noted that, in the present embodiment, the IQ correlation values Is and Qs and the phase angle φ and phase difference φd are calculated using, not the m-bit data (i corr and q corr), but rather n (m>n) bit data (i agc and q agc) that-are extracted from the m-bit data taking into account valid bits. As shown in equation (1) and equation (2), the phase angle φ is expressed by:

$$\phi(t1) = \arctan(Qs(t1)/Is(t1)) \tag{11}$$

$$\phi(t2) = -\arctan(Is(t2)/Qs(t2)) \tag{12}$$

It should be noted that Qs/Is and Is/Qs have about the same value both in the case where they are found using m-bit data (i corr and q corr) and in the case where they are found using n-bit data (i agc and q agc). An appropriate phase angle φ and phase difference φd can therefore be found even in the case where the data (i agc and q agc) which are the outputs of AGC circuit 34 are employed.

The phase angle φ and phase difference φd can therefore be obtained using the φ (t1) and φ (t2) that were thus obtained by taking the difference with the signal one symbol previous.

The phase difference φd obtained by phase calculator 35 is supplied to automatic frequency control circuit (AFC) 30; AFC 30 calculates the carrier frequency error and outputs the corrected amount of change of phase θ.

$$\begin{aligned}\phi d(t) &= \phi(t) - \phi(t - T) \\ &= \{\phi d(t) - \phi d(t - T)\} + \{\Delta\theta(t) - \Delta\theta(t - T))\} \\ &= \theta + d\theta/dt\end{aligned} \tag{13}$$

Also, in decision circuit 31, data is decoded under the control of the clock (Clock 2) and received signal RX DATA is output.

With the present embodiment, the phase calculator calculates the phase angle and phase difference taking into account the valid bits of n-bit data i corr and q corr which respectively indicate the in-phase component and quadrature component of the correlation value, by extracting n-bit data i agc and q agc, and employing these i agc and q agc. The number of bits (or number of ROM data) in the phase calculation can therefore be reduced and the scale of the circuit of the phase calculator can thereby be reduced without deterioration of the bit error rate (BER).

For example, let us consider the ROM size to be provided in the phase calculator under the assumption that, as described above, m=9 and n=6. It should be noted that, in this case, taking the number of phase quantization bits as 8 bits, in order to reduce the ROM size, consideration may be given to folding the phase plane in ¼, so the bit number of the ROM output (phase angle) may be assumed to be 6 bits.

Considering that a ROM output is obtained using m-bit data (i corr and q corr), 6 data bits are needed, with 16 ((9−1)×2) bits as address. Consequently, the capacity of the ROM in the prior art system is about 66 kbyte. In comparison, as described in the present embodiment, considering that ROM output is obtained using n-bit data (i agc and q agc), 6 data bits with 10 ((6−1)×2) bits as address are required. The ROM capacity is therefore about 1 kbyte i.e. the necessary ROM capacity can be reduced to ¹⁄₆₄ in comparison with the case where m-bit data is employed.

<Simulation Results>

The present applicants conducted a simulation in regard to bit number when n-bit data (i agc and q agc) are obtained by an AGC circuit from m-bit data (i corr and q corr) without adverse effect on bit error rate (BER). The results are shown below.

The conditions for this simulation were as follows.

| | |
|---|---|
| Information modulation | DQPSK |
| Spreading modulation | Offset chip QPSK |
| Demodulation system | Differential demodulation synchronous detection |
| Filter | Root rolloff: α = 0.5 |
| Sampling rate | Transmission: 4 samples/chip |
| | Reception: 2 samples/chip |
| Spreading code | 11-chip Barker code |
| Environment | AWGN |
| | Flat Rayleigh fading ($f_D$ = 10 Hz) |
| Amount of offset | Td = 1.5 Tc |
| DMF input bit width | I channel: 6 bits, Q channel: 6 bits |
| ArctangentROM input bit width | Prior art system: 16 bits: present system: 10 bits |
| ArctangentROM output bit width | 6 bits |

FIG. 14 is a view showing the relationship between DMF output bit width and bit error rate (BER) in an AWGN (white Gaussian noise) environment (Eb/No=−2 dB).

In FIG. 14, the vertical axis shows BER and the horizontal axis shows the DMF output bit width. This Figure shows that BER decreases when the DMF output bit width increases. Although not shown in this Figure, the case where there are 11 bits is the same as the case of an embodiment of the present invention where-AGC is not provided. In this Figure, in the case of 4 bits, BER=8.5×10⁻³, in the case of 5 bits, BER=1.8×10⁻³, in the case of 6 bits, BER=1.2×10⁻³, in the case of 7 bits, BER=1.2×10⁻³ and, in the case of 8 bits, BER=1.1×10⁻³.

As shown in FIG. 14, between 4 bits and 6 bits, BER decreases with increase in bit number but, thereafter, even though the bit number increases, BER is not much improved. It can therefore be seen that in order to achieve decoding without adverse effect on BER, 6 bits are necessary but further increase beyond this does not serve much purpose. Accordingly, in this embodiment DMF output bit width is set=6. It should be noted that if some deterioration of BER can be accepted, 5 bits is sufficient, or, alternatively, the bit number may be increased to 7 bits or more.

FIG. 15 is a view showing the BER characteristic of an AGC circuit according to this embodiment under an AWGN environment. In this case, as in the example described above, m=9 and n=6 are set. In FIG. 15, curve 1501 is the BER characteristic corresponding to the case where, as conventionally, m (=9) bit data are employed without modification; curve 1502 is the BER characteristic when n (=6) bit data are employed by an AGC circuit. From FIG. 15, it can be seen that, even when the bit width is reduced from 9 bits to 6 bits, the deterioration of BER is less than 0.3 dB. Regarding this amount of deterioration of the BER characteristic, considering for example a system with an area radius of 100 m, a deterioration of 0.3 dB equates to a distance of less than 1 m; considering that the effects of fading etc. may produce a deterioration of more than 10 dB, this is a level that gives rise to no concern at all.

FIG. 16 is a view showing the BER characteristic in a fading (flat Rayleigh fading ($f_D$=10 Hz) environment of an AGC circuit according to this embodiment. In this case, as in the example described above, m=9, and n=6 are set. In FIG. 16, curve 1601 shows the BER characteristic corresponding to the case where, as conventionally, m (=9) bit data are used without modification and curve 1602 shows the BER characteristic corresponding to the case where n (=6) bit data are employed by an AGC circuit. It can be seen that, even when the bit width is reduced from 9 bits to 6 bits, as shown in FIG. 16, the deterioration of the BER is less than 0.2 dB. As mentioned above, this level of deterioration of the BER characteristic gives rise to no problems at all.

As described above, with the second embodiment of the present invention, an automatic gain control circuit is arranged between a correlator and a phase angle calculator and, in this automatic gain control circuit, taking into account the valid bit number, n (m>n) bit data are extracted from m-bit data respectively indicating the in-phase component and quadrature component of the correlation; this makes it possible to reduce the scale of the circuit of the phase angle calculator by restricting the increase in bit number yet without adverse effect on the bit error rate (BER); as a result, receiver power saving can be achieved. Consequently, in terrestrial mobile communication equipment, ROM size can be reduced thereby enabling power consumption to be cut; this is particularly beneficial for products for which low power consumption is sought, such as battery-driven portable equipment.

What is claimed is:

1. A method of spread spectrum communication using QPSK modulation system, comprising:
    a delay step for applying, to one of the IQ (in-phase, quadrature phase) components, a time difference Td with respect to the other component (Tc<Td<T/2, where Tc is the spreading code chip period, and T is the symbol period);
    a modulation step for modulating the I component with a carrier signal and the Q component with a carrier signal to which is applied a prescribed phase difference;
    a transmission step for synthesising and transmitting the modulated IQ components;
    a reception step for receiving the transmitted signal;
    a demodulating step for demodulating the received signal with said carrier signal and carrier signal to which said prescribed phase difference has been applied into respective IQ components; and
    a decoding step for decoding the data using vector of the received signal at time point t and vector of the received signal at time point (t+Td).

2. A method of spread spectrum communication according to claim 1, comprising a clock recovery step in which a clock is recovered using the vector of the received signal at time point t and the vector of the received signal at time point (t+Td).

3. A method of spread spectrum communication according to claim 1, comprising a frequency correction step in which a carrier frequency error is found using the vector of the received signal at time point t and the vector of the received signal at time point (t+Td), and the correction is performed in baseband.

4. A spread spectrum receiver using QPSK modulation system, comprising:
    receiving means that receive a signal transmitted with a prescribed time difference Td applied between the IQ components;
    a demodulating circuit that demodulates the IQ components by modulating the received signal with a carrier signal and a carrier signal that has been given a prescribed phase difference; and
    a decoding section that decodes data using vector of the received signal at time point t and vector of the received signal at time point (t+Td).

5. A spread spectrum receiver according to claim 4, wherein the demodulating circuit comprises:
    a plurality of sliding correlators that respectively calculate correlation of baseband signal of the IQ components and spreading code;
    a sampling circuit that samples output signal of said plurality of sliding correlators;
    a phase calculator that calculates phase on the basis of ratio of the I component and Q component of output signal of said sampling circuit;
    a differential decoding circuit that performs differential decoding on output signal of said phase calculator;
    an automatic frequency control circuit that corrects frequency error of output signal of said differential decoding circuit; and
    a decoding circuit that decodes data from output signal of said automatic frequency control circuit.

6. A spread spectrum receiver according to claim 5, comprising:
    a plurality of absolute value circuits that respectively calculate absolute values of amplitudes of the output signals of said plurality of sliding correlators;
    a first adder that adds outputs of said plurality of absolute value circuits;
    an integrating circuit that integrates output signal of said first adder;
    a delay circuit that delays baseband signal output by said integrating circuit, by said time difference Td;
    a second adder that adds output signal of said delay circuit and output signal of said integrator;
    a maximum value detection circuit that detects maximum value of output signals of said second adder;
    a synchronisation circuit that holds position of said maximum value; and
    a clock recovery circuit that includes a sampling timing generator that generates a first pulse signal that repeats with a period of Td and (T−Td) and a second pulse signal of period T/2 on the basis of output signal of said synchronisation circuit.

7. A spread spectrum receiver according to claim 6, wherein said maximum value detection circuit holds position on time axis of the maximum value in previous detection results and compares this maximum value position which is held with the maximum value position of the output signal of said second adder and, if these two are the same, outputs this position as the maximum value position.

8. A spread spectrum receiver according to claim 6, wherein said maximum value detection circuit holds position on time axis of the maximum value in previous detection results and compares this maximum value position which is held with the maximum value position of the output signal of said second adder and, if these two are not the same, outputs a position intermediate these positions as the maximum value position.

9. A spread spectrum receiver according to claim 8, wherein said maximum value detection circuit outputs a position close to the maximum value position which is held as the maximum value position.

10. A spread spectrum receiver according to claim 5, wherein said differential decoding circuit comprises delay means for delaying the output signal of said phase calculator by the symbol period T and a subtractor for outputting the difference of the output signal of said delay means and the output signal of said phase calculator.

11. A spread spectrum receiver according to claim 5, wherein said automatic frequency control circuit comprises:
    a subtractor that receives the output signal of said differential decoding circuit and averaged frequency error and performs correction of carrier frequency in baseband;

a frequency error calculator that calculates frequency error on the basis of output signal of said subtractor; and an averaging circuit that averages output signal of said frequency error calculator and supplies this to said subtractor.

12. A spread spectrum receiver according to claim 11, wherein said frequency error calculator finds the frequency error $d\theta/dt$ in accordance with the following equations:

when $0 \leq \phi d < \pi/2$, $d\theta/dt = \phi d$ when $\pi/2 \leq \phi d < 3\pi/2$, $d\theta/dt = \phi d - \pi$ when $3\pi/2 \leq \phi d < 2\pi$, $d\theta/dt = \phi d - 2\pi$.

13. A spread spectrum receiver according to claim 5, wherein said decoding circuit outputs the following values with respect to input signal $\theta$ ($0 \leq \theta > 2\pi$) from said automatic frequency control circuit:

when $0 \leq \theta < \pi/2$, $3\pi/2 \leq \theta < 2\pi$, "1"

when $\pi/2 \leq \theta 0 < 3\pi/2$, "0".

14. A spread spectrum receiver using QPSK modulation system, comprising:

a quadrature detection circuit that converts an intermediate frequency signal obtained on the basis of a received signal to quadrature baseband signals;

two correlators that respectively calculate correlation between the baseband signals and spreading code;

an automatic gain control circuit comprising calculating valid bits means for calculating the number of valid bits in each symbol period of the baseband signal and data selection means for extracting, based on the calculated valid bits, data of n (m>n) bits from the m-bit data respectively indicating the I component and Q component of the correlation output from the correlators; and a decoding circuit for calculating the phase on the basis of the ratio of the I component and Q component of the n-bit data obtained by said automatic gain circuit and that performs differential decoding of the calculated phase so as to decode the data.

15. A spread spectrum receiver according to claim 14, wherein said calculating valid bits means of said automatic gain control circuit comprises:

a maximum value detection circuit that detects the maximum value of absolute values in each symbol period for the respective baseband signals that are in quadrature; and a comparison circuit that compares the maximum value with a prescribed threshold value, output of said comparison circuit being corresponding to valid bits.

16. A spread spectrum receiver according to claim 15, wherein said comparison circuit of said calculating valid bits means holds as threshold value a value approximately corresponding to position where leading bit of the valid bits changes.

17. A spread spectrum receiver according to claim 14, wherein said data selection means is constituted so as to extract n-bit data by selecting a prescribed bit number from the leading bit of the valid bits, based on the valid bits.

18. An automatic gain control circuit arranged on a signal path in a spread spectrum communication receiver employing a QPSK modulation system between respective outputs of two correlators that calculate correlation between a baseband signal and spreading code and a phase calculator that calculates phase on the basis of the ratio of I component and Q component of the correlation values, comprising:

calculating valid bits means that calculates the number of valid bits in each symbol period of the baseband signal; and data selection means that extract data of n (m>n) bits from m-bit data indicating respectively the I component and Q component of the correlation values output from the correlators, based on the calculated valid bits.

19. The receiver of claim 4, wherein the prescribed time difference Td is selected in the range between a spreading code chip period Tc and half of a symbol period T.

* * * * *